Feb. 26, 1974  J. D. RAAL  3,794,566
VAPOR-LIQUID EQUILIBRIUM STILL
Filed Oct. 28, 1971  3 Sheets-Sheet 1
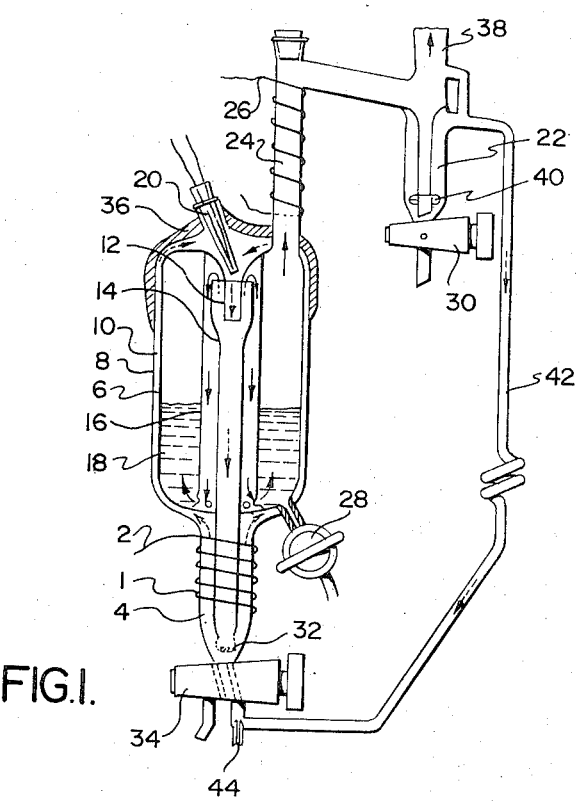
FIG.I.
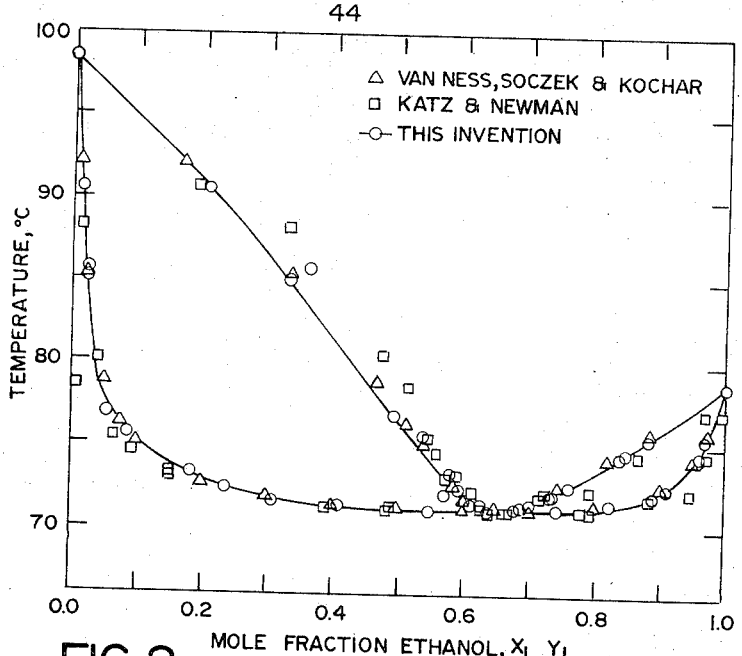
FIG.2.

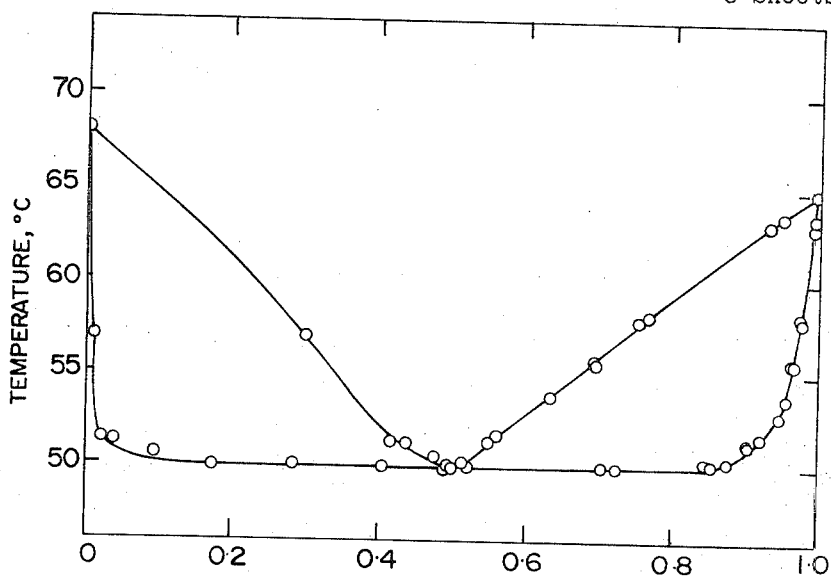
FIG. 3. MOLE FRACTION METHANOL, $X_1, Y_1$
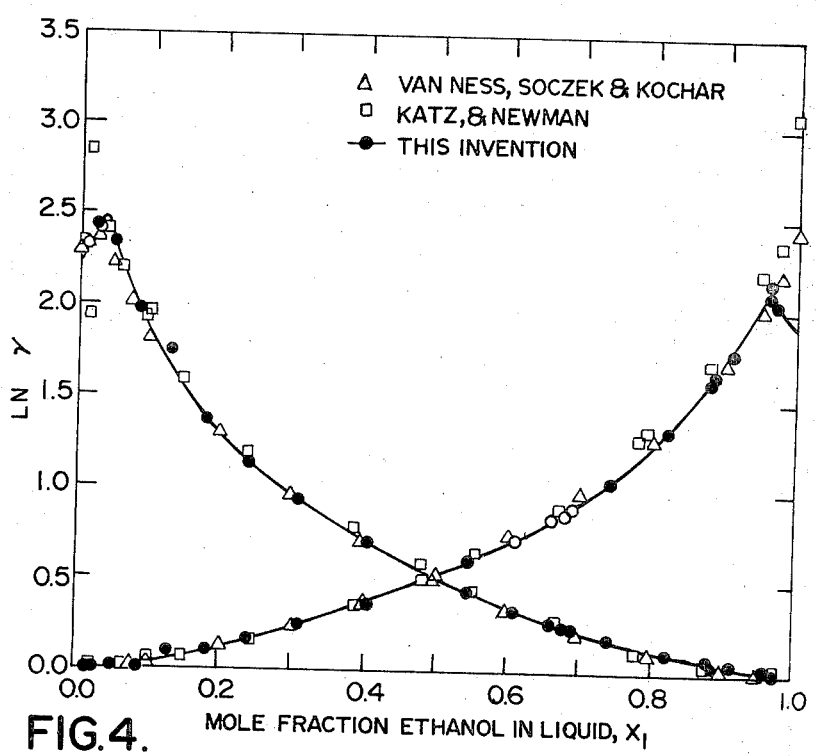
FIG. 4. MOLE FRACTION ETHANOL IN LIQUID, $X_1$ United States Patent Office 3,794,566
Patented Feb. 26, 1974

3,794,566
VAPOR-LIQUID EQUILIBRIUM STILL
Johan D. Raal, Kingston, Ontario, Canada, assignor to Canadian Patents and Development Limited, Ottawa, Ontario, Canada
Filed Oct. 28, 1971, Ser. No. 193,531
Int. Cl. B01d 3/42
U.S. Cl. 202—160   6 Claims

ABSTRACT OF THE DISCLOSURE

In a vapor-liquid equilibrium still, heated liquid and vapor is conveyed from a heating chamber upwardly, in the manner of a Cottrell pump, around an inner equilibrium chamber to a heated liquid trap above the inner equilibrium chamber. Vapor from the heated liquid trap is bubbled through liquid in the inner equilibrium chamber, whilst liquid from the heated liquid trap is returned to the heating chamber. The heated liquid and vapor conveyed upwardly around the inner equilibrium chamber provides a thermal envelope therearound and ensures truly adiabatic conditions in the inner equilibrium chamber.

---

Figure 5:
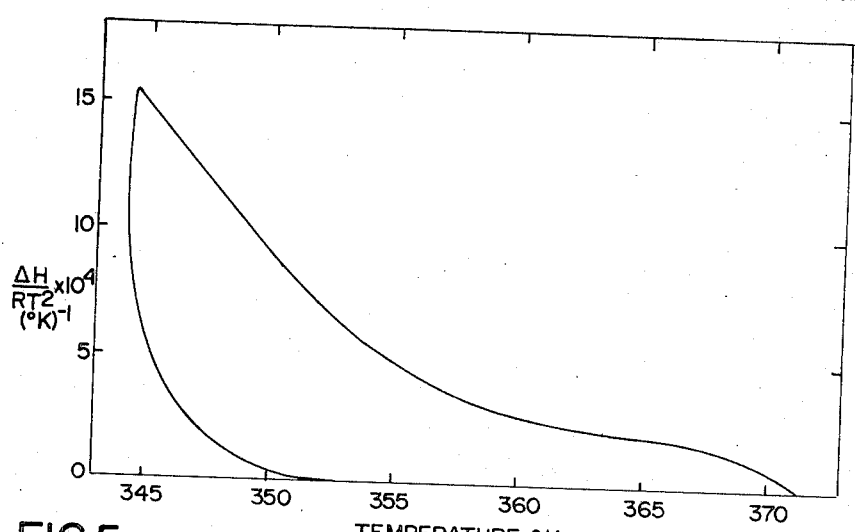

This invention relates to vapor-liquid equilibrium stills.

The search for a dynamic vapor-liquid equilibrium still that would yield thermodynamically consistent data for a variety of systems which may differ markedly in physical properties has led to the proposal of a large number of different designs. A survey of some of these is given in "Vapour Liquid Equilibrium" by E. Hala, J. Pick, V. Fried and O. Vilim, Pergamon Press (1958). Among the more serious difficulties encountered with some of these devices are partial condensation of the equilibrium vapor (which may lead to considerable error), inadequate mixing and vapor-liquid contact in the equilibrium chamber, complete evaporation of liquid droplets and imprecise temperature measurement.

An attractive feature of stills with vapor-phase circulation of the kind proposed by "Jones, C. A., E. M. Schoenborn and A. P. Colburn, Industrial and Engineering Chemistry," 35, 666 (1943) is the excellent mixing and intimate contact of vapor bubbles with surrounding liquid in the equilibrium chamber. Drawbacks of this design (and its subsequent modifications) are the imprecise measurement of boiling temperature and the difficulties encountered in exactly balancing heat losses to maintain adiabatic operation of the equilibrium chamber. Also, vertical temperature gradients in the latter such as may arise from uneven heating, may produce erroneous results.

The above drawbacks are largely eliminated in stills with circulation of both liquid and vapor phases of the type proposed by Gillespie, D. T. C., Ind. Eng. Chem., Anal. Ed. 18, 575 (1946) and subsequently modified by several investigators one of which is R. T. Fowler, and G. S. Norris, J. Appl. Chem. (London), 5, 266 (1955). The Cottrell pump described by F. G. Cottrell in the Journal of the American Chemical Society, vol. XL1, 1919, pp. 721–729, is a feature of these stills and permits very precise temperature measurement but provides less satisfactory mixing and vapor-liquid contact than the bubbling chamber of the above-mentioned Jones et al. still. Partial condensation of equilibrium vapor, although very effectively reduced by the Cottrell pump feature probably is not completely eliminated particularly in the region of the thermocouple well. The rather long times required to reach steady-state are also unsatisfactory.

It is an object of the present invention to provide a still wherein the efficient mixing characteristics of the Jones et al. still are combined with a novel adaptation of the Cottrell pump to provide more accurate temperature measurement and to ensure more or less adiabatic operation of the equilibrium chamber over a wide range of operating temperatures.

According to the invention there is provided a vapor-liquid equilibrium still, comprising a liquid heating and vaporizing chamber, means for heating and vaporizing liquid within the liquid heating and vaporizing chamber, an equilibrium chamber above the liquid heating and vaporizing chamber, an upwardly extending extension from the liquid heating and vaporizing chamber enclosing a passage around the equilibrium chamber, the extension being for conveying as a Cottrell pump a mixture of heated liquid and vapor as a thermal envelope around the equilibrium chamber to provide substantially adiabatic conditions therein in operation, a heated liquid trap, for receiving the mixture of heated liquid and vapor, in an upper portion of the equilibrium chamber, first conduit means, extending downwardly from the trap into a lower portion of the liquid heating and vaporizing chamber, for returning trapped heated liquid from the trap downwardly through the equilibrium chamber to the liquid heating and vaporizing chamber, second conduit means, extending downwardly from the trap into the equilibrium chamber, for passing separated vapor from the trap downwardly through the equilibrium chamber and bubbling it through liquid therein, means for measuring the temperature of the mixture of heated liquid and vapor at the trap, a sample trap, third conduit means for passing the bubbled vapor from an upper portion of the equilibrium chamber to the sample trap, means for superheating vapor passed to the sample trap, means for sampling liquid from the equilibrium chamber, means for sampling superheated vapor from the sample trap, and fourth conduit means for passing condensate from the sample trap to a lower portion of the liquid heating and vaporizing chamber.

In the accompanying drawings, which illustrate by way of example, an embodiment of the present invention, FIG. 1 is a diagrammatic side view of a vapor-liquid equilibrium still, FIGS. 2 and 3 show graphs of experimental temperature composition curves obtained using the apparatus shown in FIG. 1, and FIGS. 4 to 6 show activity coefficients derived from experiments with the apparatus shown in FIG. 1.

Referring to FIG. 1 there is shown a vapor-liquid equilibrium still, comprising a liquid heating and vaporizing chamber 1, means in the form of heating coil 2 for heating and vaporizing liquid 4 within the liquid heating and vaporizing chamber 1, an equilibrium chamber 6 above the liquid heating and vaporizing chamber 1, an upwardly extending extension 8 from the liquid heating and vaporizing chamber 1, the extension enclosing a passage 10 around the equilibrium chamber 6 to provide substantially adiabatic conditions therein in operation, for conveying as a Cottrell pump a mixture of heated liquid and vapor as a thermal envelope around the equilibrium chamber 6, a heated liquid trap 12, for receiving from the passage 10 the mixture of heated liquid and vapor, in an upper portion of the equilibrium chamber 6, first conduit means 14, extending downwardly from the trap into a lower portion of the liquid heating and vaporizing chamber 1, for returning trapped heated liquid from the trap 12 downwardly through the equilibrium chamber 6 to the liquid heating and vaporizing chamber 1, second conduit means 16, extending downwardly from the trap into the equilibrium chamber 6, for passing separated vapor from the trap 12 downwardly through the equilibrium chamber 6 and bubbling it through liquid 18 therein, means in the form of a thermocouple 20 for measuring the temperature of the mixture of heated liquid and vapor at the trap 12, a sample trap and condensate collecting 22, third conduit means 24 for passing the bubbled vapor from an upper portion of the equilibrium chamber 6 to the sample trap 22, means in the form of a heating coil 26 for superheating vapor passed to the sample trap 22, means in the form of a valve 28 for sampling liquid 18 from the equilibrium chamber 6, means in the form of a valve 30 for sampling superheated vapor from the sample trap 22, and fourth conduit means 42 for passing condensate from the sample trap to a lower portion of the liquid heating and vaporizing chamber.

The heating coil 2 is an electrical resistance winding and the equilibrium chamber 6 fits closely inside the extension 8. It will be appreciated that instead of the heating coil 2, a bare wire electrical resistance heater may, for example, be used disposed within the liquid in the liquid heating and vaporizing chamber. A shield member 32 is mounted in the liquid heating and vaporizing chamber, for bubbles in the liquid 4 to impinge on so that the bubbles are directed into the passage 10, this also probably assists somewhat in the mixing of returning condensate from a stopcock 34 described below. The extension 8 is lagged with thermal insulation 36 around an upper portion thereof to substantially prevent partial condensation in the upper portion of the passage 10. Substantial elimination of vapor condensation in the upper portion of the passage 10, and efficient heat transfer between the interior of the equilibrium chamber 6 and the passage 10, should ensure substantial equilization of composition of the contents in these two regions at equilibrium.

An outlet 38 above the sample trap 22 leads to a condenser and manostat (not shown). A magnetic stirrer 40 is mounted in the sample trap 22 as stirring means to stir condensed vapor therein before it is returned by the fourth conduit means 42 to the liquid heating and vaporizing chamber 1 through the stopcock 34. A capillary inlet tube 44 is provided to introduce a slow stream of fine dry bubbles of air or some other gas which is inert to the system, from a source (not shown) to prevent superheating and bumping of liquid in the liquid heating and vaporizing chamber 1.

In operation the apparatus is arranged as shown, with liquid in the liquid heating and vaporizing chamber 1 and the equilibrium chamber 6, and the experiments given below were made for two binary systems. It was found that the regions within the equilibrium chamber 6 and passage 10 invariably reached the same composition at equilibrium. It was found, however, that liquid samples should be taken from the equilibrium chamber 6 by valve 28 since there is no danger of incomplete mixing of returned condensate by conduit 42 or cooling of the equilibrium chamber 6.

Liquid was heated and vaporized in the liquid heating and vaporizing chamber 1 so that liquid and vapor passed upwardly along the passage as described above with the vapor bubbling through the liquid 18 and the liquid returning by conduit means 14 to the liquid heating and vaporizing chamber 1. The temperature of the liquid and vapor was measured by the thermocouple 20. Condensed vapor was withdrawn from trap 22 by valve 30. Liquid samples were also taken from the equilibrium chamber 6. Liquid samples were taken from liquid 18 by valve 28.

Condensed vapor from the sample trap 22 was returned by conduit 42 to the liquid heating and vaporizing chamber 1 whilst, as previously stated, fine dry air bubbles were introduced therein as a slow stream by means of the capillary inlet 44.

Having the equilibrium chamber 6 enclosed by the passage 10 carrying boiling liquid and vapor ensures that equilibrium vapor bubbles from the second conduit means 16 pass through liquid 18 in the equilibrium chamber 6. It has been found that truly adiabatic conditions are ensured in the liquid 18 in the equilibrium chamber 6 when the liquid 18 reaches the same composition as the mixture of heated liquid and vapor in the passage 10.

As the vapor from the trap 12 is conveyed by the second conduit means 16 through the equilibrium chamber 6, which is enclosed by passage 10, the possibility of partial condensation of the vapor within the second conduit means 16 is eliminated.

Partial condensation from vapor arising from the liquid 18 is prevented by the thermal envelope formed by heated liquid and vapor in the passage 10.

The use of the passage 10 as a Cottrell pump facilitates accurate temperature measurement and also ensures efficient heat transfer between heated liquid and vapor in the passage 10 and the liquid 18, thus aiding the achievement of rapid thermal equilibrium and composition equilibrium between the heated liquid and vapor in the passage 10 and the liquid 18. The efficient heat transfer is due to the rapid flow of heated liquid and vapor in the passage 10, and the relatively large surface area provided for heat transfer between, on the one hand the well mixed heated liquid and vapor in the passage 10, and on the other hand the well mixed liquid 18.

EXPERIMENTAL

The two binary systems chosen for the present study were ethanol-n-heptane and methanol-n-hexane. Heats of mixing data for these systems are available from the work of H. C. Van Ness, C. A. Sozek and N. K. Kochar, Journal of Chemical and Engineering Data, 12, 346, 1967, and G. G. Savini, D. A. Winterhalter and H. C. Van Ness, Journal of Chemical and Engineering Data, 10, 168 (1965). Also, the relative volatilities are very large in the dilute regions and accurate determination of the temperature-composition data offers a stringent test of the capabilities of the still. The methanol used was the 99.9 mole percent Fisher certified reagent and the n-heptane and n-hexane were pure grade reagents of the Phillips Petroleum Co. and ethanol was the anhydrous reagent. Physical properties of the reagents compared satisfactorily with published values and no further purification was attempted.

A Fisher Cartesian manostat in series with a 10 liter reservoir at constant temperature was used to control operating pressure to 760 mm. mercury for both systems. Ethanol-heptane mixtures were analyzed by refractive index. Methanol-hexane mixtures were analyzed chromatographically in the range 0.10 to 0.92 mole fraction and by refractive index in the remaining composition intervals. Samples were dissolved in a small amount of pure benzene before chromatographic analysis to avoid phase separation.

LIQUID PHASE ACTIVITY COEFFICIENTS

TABLE I.—EQUILIBRIUM DATA AND COMPUTED ACTIVITY COEFFICIENTS FOR THE ETHANOL-n-HEPTANE SYSTEM AT 760 MM. Hg

| Mole fraction in— | | Temperature (° C.) | $\ln \gamma_1$ | Correction factor $\gamma_1$ (corr.) | $\ln \gamma_2$ | $\gamma_2$ (corr.) |
|---|---|---|---|---|---|---|
| Liquid | Vapor | | | | | |
| 0.013 | 0.205 | 90.5 | 2.320 | 1.028 | −0.002 | 0.986 |
| 0.023 | 0.330 | 85.0 | 2.422 | 1.019 | 0.003 | 0.977 |
| 0.025 | 0.360 | 85.6 | 2.402 | 1.019 | −0.059 | 0.979 |
| 0.051 | 0.490 | 76.8 | 2.328 | 1.005 | 0.021 | 0.968 |
| 0.083 | 0.535 | 75.6 | 1.974 | 1.002 | 0.004 | 0.967 |
| 0.128 | 0.570 | 72.0 | 1.746 | 0.996 | 0.098 | 0.964 |
| 0.181 | 0.580 | 73.3 | 1.364 | 0.998 | 0.093 | 0.966 |
| 0.241 | 0.590 | 72.4 | 1.131 | 0.997 | 0.176 | 0.965 |
| 0.309 | 0.605 | 71.6 | 0.939 | 0.995 | 0.260 | 0.965 |
| 0.406 | 0.625 | 71.4 | 0.706 | 0.994 | 0.367 | 0.965 |
| 0.546 | 0.635 | 71.1 | 0.437 | 0.994 | 0.620 | 0.965 |
| 0.610 | 0.648 | 71.4 | 0.334 | 0.994 | 0.726 | 0.966 |
| 0.660 | 0.653 | 71.2 | 0.271 | 0.993 | 0.856 | 0.966 |
| 0.679 | 0.660 | 71.3 | 0.249 | 0.993 | 0.890 | 0.967 |
| 0.690 | 0.666 | 71.3 | 0.242 | 0.993 | 0.907 | 0.967 |
| 0.742 | 0.678 | 71.2 | 0.191 | 0.993 | 1.058 | 0.967 |
| 0.821 | 0.700 | 71.5 | 0.109 | 0.993 | 1.344 | 0.969 |
| 0.880 | 0.732 | 71.9 | 0.068 | 0.993 | 1.618 | 0.970 |
| 0.886 | 0.732 | 72.1 | 0.053 | 0.993 | 1.663 | 0.971 |
| 0.910 | 0.760 | 72.5 | 0.048 | 0.993 | 1.777 | 0.972 |
| 0.961 | 0.847 | 74.5 | 0.022 | 0.995 | 2.099 | 0.978 |
| 0.961 | 0.837 | 74.3 | 0.018 | 0.995 | 2.169 | 0.978 |
| 0.969 | 0.881 | 75.4 | 0.017 | 0.996 | 2.049 | 0.981 |

TABLE II.—EQUILIBRIUM DATA AND COMPUTED ACTIVITY COEFFICIENTS FOR THE METHANOL-n-HEXANE SYSTEM AT 760 MM. Hg

| Mole fraction methanol in— | | Temperature (° C.) | Correction factor | | | |
|---|---|---|---|---|---|---|
| Liquid | Vapor | | ln $\gamma_1$ | $\frac{\gamma_1}{\gamma_1 \text{(corr.)}}$ | ln $\gamma_2$ | $\frac{\gamma_2}{\gamma_2 \text{(corr.)}}$ |
| 0.010 | 0.300 | 56.9 | 3.737 | 1.004 | 0.025 | 0.984 |
| 0.022 | 0.418 | 51.3 | 3.507 | 0.990 | 0.044 | 0.981 |
| 0.040 | 0.439 | 51.2 | 2.962 | 0.989 | 0.030 | 0.981 |
| 0.095 | 0.477 | 50.5 | 2.208 | 0.986 | 0.044 | 0.982 |
| 0.175 | 0.491 | 49.9 | 1.650 | 0.984 | 0.131 | 0.982 |
| 0.283 | 0.496 | 50.0 | 1.175 | 0.984 | 0.259 | 0.982 |
| 0.405 | 0.497 | 49.9 | 0.823 | 0.984 | 0.447 | 0.982 |
| 0.525 | 0.502 | 49.0 | 0.983 | 0.983 | 0.694 | 0.982 |
| 0.704 | 0.500 | 49.9 | 0.276 | 0.984 | 1.139 | 0.983 |
| 0.724 | 0.500 | 49.9 | 0.248 | 0.984 | 1.209 | 0.983 |
| 0.846 | 0.516 | 50.2 | 0.110 | 0.984 | 1.750 | 0.984 |
| 0.854 | 0.516 | 50.1 | 0.105 | 0.984 | 1.807 | 0.983 |
| 0.875 | 0.515 | 50.2 | 0.075 | 0.984 | 1.961 | 0.983 |
| 0.906 | 0.550 | 51.4 | 0.054 | 0.985 | 2.131 | 0.986 |
| 0.906 | 0.551 | 51.2 | 0.064 | 0.984 | 2.135 | 0.986 |
| 0.922 | 0.560 | 51.7 | 0.041 | 0.985 | 2.285 | 0.987 |
| 0.923 | 0.560 | 51.6 | 0.045 | 0.985 | 2.301 | 0.987 |
| 0.949 | 0.612 | 52.8 | 0.054 | 0.985 | 2.549 | 0.990 |
| 0.957 | 0.635 | 53.8 | 0.040 | 0.986 | 2.625 | 0.992 |
| 0.965 | 0.664 | 54.7 | 0.039 | 0.987 | 2.719 | 0.994 |
| 0.965 | 0.695 | 55.8 | 0.039 | 0.988 | 2.587 | 0.997 |
| 0.968 | 0.694 | 55.6 | 0.042 | 0.988 | 2.687 | 0.997 |
| 0.977 | 0.768 | 58.2 | 0.027 | 0.991 | 2.657 | 1.002 |
| 0.978 | 0.755 | 57.9 | 0.022 | 0.991 | 2.765 | 1.001 |
| 0.993 | 0.935 | 63.0 | 0.015 | 0.997 | 2.426 | 1.410 |
| 0.9955 | 0.950 | 63.5 | 0.009 | 0.998 | 2.590 | 1.015 |

In the following equations the symbols used are defined as follows,

A, B, C, D=constant in Equation 3 or in the equation for $B_{11}=f(T)$ $$A_1 = \int_0^1 \ln \gamma_1 dx_1$$

$$A_2 = \int_0^1 \ln \gamma_2 dx_1$$

$$A_H = \int_{x=1}^{x=1} (\Delta H/RT^2) dT$$

$\Delta A = A_1 - (A_2 + A_H)$
$\Sigma A$ = are sums as defined in the following Table IV
$B_{11}$ = second virial coefficient for pure component 1
$B_{22}$ = second virial coefficient for pure component 2
$B_{12}$ = second virial cross-coefficient
H = molar enthalpy of mixing, joules/g. mole
P = total pressure
$P_1°$, $P_2°$ = vapor pressures of pure components 1, 2
R = gas constant
T = temperature, ° K.
$V_1^L$, $V_2^L$ = pure component liquid molar volumes, cc./g. mole
$x_1$, $x_2$ = mole fractions of components 1, 2 in liquid phase
$y_1$, $y_2$ = mole fractions of components 1, 2 in vapor phase Greek letters:
$\alpha^{12}$ = relative volatility
$\gamma_1$, $\gamma_2$ = liquid phase activity coefficients of components 1, 2
$\delta_{12} = 2B_{12} - B_{11} - B_{22}$ Subscripts:
1 = component 1
2 = component 2
$i$ = component 1 or component 2

Experimental composition-temperature data for the two systems are shown in the above Tables I and II. Also shown are the liquid phase activity coefficients. Accurate computation of the latter requires that vapor phase non-idealities be taken into account. The corrections are conveniently incorporated in the expression derived from Prausnitz, J. M., "Molecular Thermodyamics of Fluid Equilibria," Prentice-Hall, Englewood Cliffs, N.J. (1969), given below:

$$\ln \gamma_1 = \ln \frac{y_1 p}{x_1 P_1°} + \frac{(B_{11} - v_1^L)(P - P_1°)}{RT} + \frac{Py^2 \delta_{12}}{RT} \quad (1a)$$

$$\ln \gamma_2 = \ln \frac{y_2 P}{x_2 P_2°} + \frac{(B_{22} - v_2^L)(P - P_2°)}{RT} + \frac{Py_1^2 \delta_{12}}{RT} \quad (1b)$$

$\delta_{12}$ is defined in terms of the second virial coefficients:

$$\delta_{12} = 2B_{12} - B_{11} - B_{12}$$

These equations are essentialy rigorous if the vapor phase at all compositions is satisfactorily described by the volume-explicit virial equation of state truncated at the second virial coefficients, and if the pure component liquid molar volumes ($v_1^L$, $v_2^L$) are pressure independent over the range of interest. The magnitudes of the vapor-phase correction factors, $\gamma_1$ (corrected)/$\gamma_1$, are shown in Table I and II.

The pure component vapor pressures ($P_1°$, $P_2°$) were computed at the experimental temperatures from Antoine-type equations using the constants given by Van Ness, C. A. Soczek and N. K. Kochar in the work mentioned above (ethanol, heptane) and by Jordan, T. E., "Vapour Pressure of Organic Compounds," Interscience Pub. Inc., New York (1954) (methanol, hexane). Molar volumes were determined using density-temperature formulae given in International Critical Tables, vol. 3, McGraw-Hill, New York (1929).

Estimation of virial coefficients

Second virial coefficients for ethanol and methanol were computed as functions of temperature from the recently measured values given by Knoebel and Edmister, Journal of Chemical and Engineering Data, 13, 312 (1968). These were fitted to equations of the form $$B_{11} = AT^2 + BT + C$$

yielding the constants shown in Table III. A similar procedure was followed to obtain $B_{22}$ for heptane and hexane in the temperature range of interest based on the data of M. C. McGlashan and D. J. B. Potter, Proceedings of the Society, 267A, 478 (1962). Corresponding constants in the above equation are also listed in the following Table III.

TABLE III

Second virial coefficients of pure components as functions of temperature according to the equation: $B_{ii} = AT^2 + BT + C$

| Components | Units for T | A | B | C | $B_{ii}$ |
|---|---|---|---|---|---|
| Ethanol | ° C. | −0.40875 | 86.275 | −5227.0 | (1) |
| Methanol | ° C. | −0.84125 | 134.125 | −6098.0 | (1) |
| n-Heptane | ° K. | −0.08055 | 71.390 | −16928.5 | (2) |
| N-Hexane | ° K. | 0.16932 | −101.587 | 13643.3 | (2) |

[1] Source of data: Knoebel, D. H. and W. C. Edmister, J. Chem. Eng. Data, 13, 312 (1968).
[2] Source of data: McGlashan, M. L. and D. J. B. Potter, Proc. Roy. Soc., 267A, 478 (1962).

Second virial cross-coefficients $B_{12}$ for the two systems were determined from the correlations of K. S. Pitzer and R. F. Curl, Journal of the American Chemical Society, 79, 2369 (1957) "mixing rules" and acentric factors were those suggested by J. M. Prausnitz et al., "Computor Calculations of Vapour-Liquid Equilibria," Prentice Hall, Englewood Cliffs, N.J. (1967).

Thermodynamic consistency tests

Experimental temperature-composition curves, using the apparatus acocrding to the present invention, for the two systems are shown in FIGS. 2 and 3 and are compared with earlier data of Katz and Newman (□) and those of Van Ness et al (△) computed from heats of mixing and P-x data. The latter data are in good agreement with those of the present invention (○). FIG. 3 shows the temperature-composition diagram for methanol-n-hexane at 760 mm. Hg. Activity coefficients computed according to Equation 1 are shown in FIGS. 4 and 5. It is of interest to note that the results of the invention for ethanol-heptane confirm the maximum in the log $\gamma_1$ vs. $x_1$ curve found by Van Ness et al. (but disregarded by Katz and Newman) and also show a maximum in the ln $\gamma_2$ vs. $x_1$ curve.

The availability of heat-of-mixing data for the systems investigated permits rigorous testing of the experimental data for thermodynamic consistency. For isobaric data the requirement according to J. M. Prausnitz is:

$$\int_0^1 \ln \frac{\gamma_1}{\gamma_2} dx_1 = \int_{x_1=0}^{x_1=1} \frac{\Delta H}{RT^2} dt$$

The term $\Delta H/RT^2$ is conveniently evaluated as a function of temperature and composition from the relationship given by Van Ness et al.

$$\frac{\Delta H}{x_1 x_2 R} = AT + \frac{BT^2}{2} + \frac{DT^3}{3} + C \qquad (3)$$

For the system ethanol-heptane the "constants" (which are functions of composition) are available directly from the work by Van Ness et al. For methanol-hexane the corresponding constants were determined by regression analysis using the experimental heat-of-mixing data of Savini, Winterhalter and Van Ness.

Figure 6:
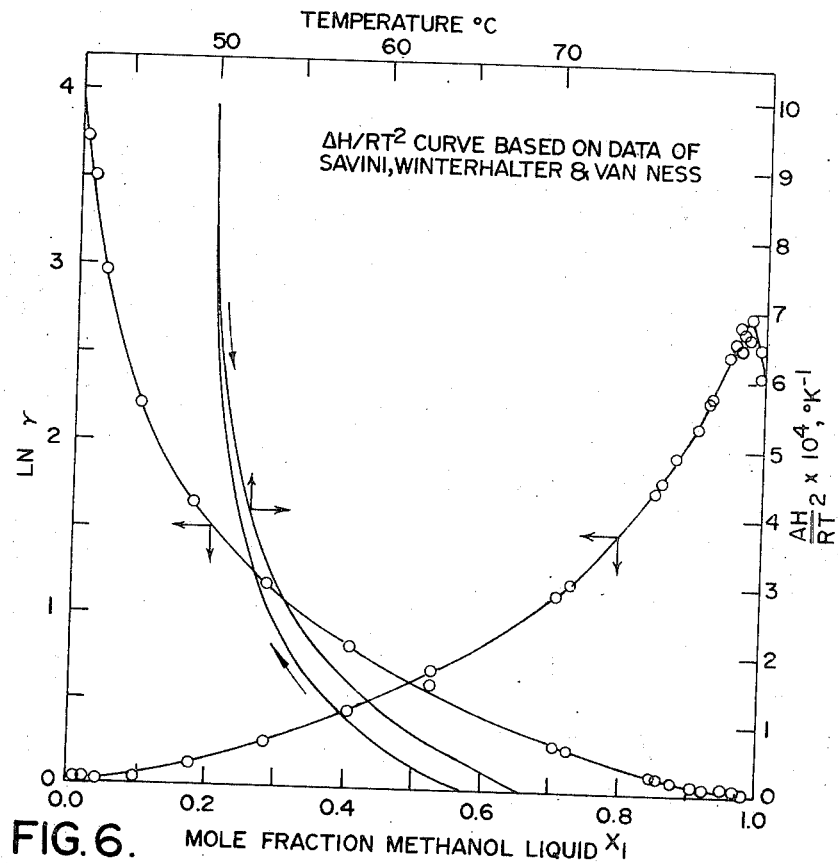

The right-hand term in Equation 2 was evaluated by numerical integration, using Lobatto's method, of the curves shown in FIGS. 5 and 6. The first term in Equation 2 was evaluated by numerical integration, using Simpson's rule of the plots shown in FIGS. 4 and 6. As a check, the area under the curve in a plot of $$\ln \frac{\gamma_1}{\gamma_2} \text{ vs. } x_1$$

was similarly evaluated. The results of these tests are shown in Table IV below. Also included are results obtained with uncorrected activity coefficients (i.e. coefficients computed using only the second term in Equation 1.

and accurate determination of equilibrium data in this region poses a considerable challenge. The temperature recorded at steady state for the experimental point $x_1=0.01$ showed a rapid uniform oscillation of small amplitude about the mean value of 56.9° C. This suggests that, with the exceptionally large differences in vapor and liquid compositions, mixing in the outer chamber in the region above the stopcock $S_1$ may have been incomplete, possibly leading to some error in the T–x–y curves for the very dilute region. Small experimental error in this region may appreciably influence the integral $$\int_0^1 \ln \gamma_1 dx_1 \left( \text{or } \int_0^1 \ln \frac{\gamma_1}{\gamma_2} dx_1 \right)$$

as seen from FIG. 4. Additional mechanical stirring in the lower portion of the outer chamber seems advisable for conditions of such extreme temperature-composition sensitivity.

The maxima observed in the $\ln \gamma_i$ vs. $x_1$ curves for both systems indicates that in certain regions the quantity $$x_i \frac{d \ln \gamma_i}{dx_1} + \frac{\Delta H}{RT^2} \frac{dT}{dx_1}$$

changes sign due to the extraordinary steepness of the temperature gradients.

The vapor liquid equilibrium still, according to the present invention has been found to be capable of producing very consistent isobaric data for a highly non-ideal binary system. At moderate rates of circulation steady-state was reached in 1½–2½ hours depending on composition. For highest accuracy with systems (or in composition regions) where the relative volatility is extremely large, incorporation of an additional stirring device in the lower region of the outer chamber is advised.

For operation at very low pressures the dimensions of the still should preferably be chosen to reduce the pressure drop along the passage 10.

TABLE IV.—Thermodynamic Consistency Tests

| Systems | $\int_{x=0\,(=A_H)}^{x=1}(\Delta H/RT^2)dT$ | $\int_0^1 \ln \gamma_1 dx_1$ $(=A_1)$ | $\int_0^1 \ln \gamma_2 dx_1 \Delta A$ $(=A_2)$ | $\Delta A$ $(=A_1-A_2-A_H)$ | $\int_0^1 \ln \frac{\gamma_1}{\gamma_2} dx_1 - A_H$ | $\Sigma A$ | $\frac{\Delta A}{\Sigma A}$ Corrected | Uncorrected |
|---|---|---|---|---|---|---|---|---|
| Ethanol-n-heptane | 0.0227 | 0.7338 | 0.6980 | 0.0131 | | 1.4545 | 0.0090 | 0.0306 |
| | | | | | [1] 0.0075 | [2] 1.0449 | 0.0072 | |
| Methanol-n-hexane | | 0.9022 | 0.8537 | 0.0476 | | [2] 1.7568 | 0.0270 | 0.0273 |
| | 0.0009 | | | | [1] 0.0435 | [3] 1.2556 | 0.0348 | |

[1] From a plot of $\ln \frac{\gamma_1}{\gamma_2}$ vs. $x_1$.

[2] $\Sigma A = A_1 + A_2 + A_H$.

[3] $\Sigma A = A_H + \int_0^{x_0} \ln \frac{\gamma_1}{\gamma_2} dx_1 - \int_{x_0}^1 \ln \frac{\gamma_1}{\gamma_2} dx_1$ ($x_0$=point where $\gamma_1 = \gamma_2$).

Although the possibility of compensating errors in an integral test cannot be discounted, results of the test for the ethanol-heptane system suggest that the data are remarkably consistent. The consistency indicated by the result $$\frac{\Delta A}{\Sigma A} \leq 0.009$$

for example, is well inside the criterion $$\frac{\Delta A}{\Sigma A} \leq 00.2$$

proposed by Prausnitz "for systems of moderate non-ideality."

Data for the system methanol-n-hexane are less consistent. In the very dilute region $x_1 < 0.05$ the relative volatility of methanol is extremely large.

(e.g. $\alpha_x{}^{12}{}_1 = .01 > {}^{40}$)

What is claimed is:

1. A vapor-liquid equilibrium still, comprising a liquid heating and vaporizing chamber for producing heated liquid with bubbling vapor therein, means for heating and vaporizing liquid within the liquid heating and vaporizing chamber, an equilibrium chamber having an inlet opening at the top and disposed above the liquid heating and vaporizing chamber and closed at the lower end therefrom, an upwardly extending extension from the liquid heating and vaporizing chamber, forming a passage around the equilibrium chamber, the extension being for conveying as a Cottrell pump action a mixture of said heated liquid and bubbling vapor from said heating and vaporizing chamber, which flows rapidly upwardly by said bubbling vapor carrying said heated liquid as a thermal envelope around the equilibrium chamber to provide substantially adiabatic condition therein in operation, a heated liquid trap in the form of a tube extending downwardly from the inlet opening of the equilibrium chamber and having an open lower end, for receiving from the equilibrium chamber the said mixture of heated liquid and bubbling vapor at the upper end, first conduit means, extending downwardly from and spaced around the lower end of the trap and into a lower portion of the liquid heating and vaporizing chamber, for returning trapped heated liquid from the trap downwardly through the equilibrium chamber to the liquid heating and vaporizing chamber, second conduit means sealed to the trap exterior, and around the first conduit means, for passing separated vapor, which has overflowed by upper end of the first conduit means, from the trap downwardly through the equilibrium chamber and bubbling it through liquid therein, means for measuring the temperature of the mixture of heated liquid and vapor at the trap, a sample and condensate collecting trap, third conduit means for passing the bubbled vapor from an upper portion of the equilibrium chamber to the sample and condensate collecting trap, means for superheating vapor passed to the sample and condensate collecting trap, means for sampling liquid from the equilibrium chamber, means for sampling superheated vapor from the sample and condensate collecting trap, and fourth conduit means for passing condensate from the bubbled vapor in the third conduit means and which has collected in the sample and condensate collecting trap to a lower portion of the liquid heating and vaporizing chamber.

2. A still according to claim 1, wherein the second conduit means is coaxial with and encloses the first conduit means.

3. A still according to claim 1, wherein a stirring means is mounted in the sample trap for stirring condensed vapor therein before it is returned by the fourth conduit means to the liquid heating and vaporizing chamber.

4. A still according to claim 1, wherein a capillary inlet tube is connected to the fourth conduit means for introducing a gas, which is inert to the still system, into the condensate before it is passed to the liquid heating and vaporizing chamber.

5. A still according to claim 4, wherein a shield member is mounted in the liquid heating and vaporizing chamber, and is below the end of the first conduit means, for directing bubbles entering from the fourth conduit means into the liquid heating and vaporizing chamber towards the passage around the equilibrium chamber.

6. A still according to claim 1, wherein the second conduit means is disposed coaxially around the first conduit means.

References Cited

UNITED STATES PATENTS 2,416,404   2/1947   Proell _____ 202—160

Cottrell: Journal of the American Chemical Society, vol. 41 (1919), pp. 721–729.

A. A. Morton: Laboratory Technique in Organic Chemistry, McGraw-Hill Co. Inc., New York 1938, pp. 50–55.

Jones et al.: Industrial and Engineering Chemistry, vol. 35, pp. 666–672 (1943).

Fowler et al.: Journal Applied Chemistry (London), vol. 5, June 1955, pp. 266 and 267.

WILBUR L. BASCOMB, JR., Primary Examiner

U.S. Cl. X. R.

73—17 A; 202—182, 197, 202; 203—Dig. 2, 2, 3